Aug. 7, 1945.  R. W. CRIST  2,381,723
CAR DUMPER
Filed Sept. 13, 1943  9 Sheets-Sheet 1

INVENTOR.
ROBERT W. CRIST
BY
Kwis Hudson Boughton & Williams
ATTORNEYS

Aug. 7, 1945.  R. W. CRIST  2,381,723
CAR DUMPER
Filed Sept. 13, 1943  9 Sheets-Sheet 2

INVENTOR.
ROBERT W. CRIST
BY
Kwis Hudson Boughton & Williams
ATTORNEYS

Aug. 7, 1945.  R. W. CRIST  2,381,723
CAR DUMPER
Filed Sept. 13, 1943  9 Sheets-Sheet 4

INVENTOR.
ROBERT W. CRIST
BY
Kwis Hudson Boughton & Williams
ATTORNEYS

FIG. 12

Aug. 7, 1945.   R. W. CRIST   2,381,723
CAR DUMPER
Filed Sept. 13, 1943   9 Sheets-Sheet 9

INVENTOR.
BY ROBERT W. CRIST
Kris Hudson Boughton & Williams
ATTORNEYS

Patented Aug. 7, 1945

2,381,723

UNITED STATES PATENT OFFICE 2,381,723

CAR DUMPER

Robert W. Crist, Cleveland, Ohio, assignor to The Wellman Engineering Company, Cleveland, Ohio, a corporation of Ohio Application September 13, 1943, Serial No. 502,151

9 Claims. (Cl. 214—55)

This invention relates to car dumpers and particularly to car dumpers of the rotary non-lifting type. More particularly, the invention relates to the car clamps for holding the car on the rails of the dumper while the cradle of the dumper is being turned to discharge the material from the car.

The principal object of the invention is to provide controls and actuating means for the clamps of such a nature that the clamps on one side of the cradle of the dumper are wholly independent of the clamps on the other side so that it becomes unnecessary to provide the same number of clamps on each side and it is possible to provide a greater number of clamps on the inner or dumping side than on the rear side. The clamps being independent of each other, failure of one to act does not prevent any other clamps from acting.

A further object is to provide a clamp hold-down mechanism of such a nature that there are no clamp holddown ropes, thus avoiding outward movement of the car in the cradle due to stretch in the ropes while in the dumping position and eliminating ropes and their maintenance.

Still further the invention aims to provide a simplified construction and one which eliminates many parts and considerable weight.

A further object is to provide mechanism for controlling and actuating the clamps of such a nature that the mechanism is not located at a point where it is likely to become covered with dust and the like from the coal, ore or other material being discharged during the dumping operation, as is the case with dumpers in use at the present time.

A further object is to provide a positive releasing arrangement for the clamps to prevent the breakage of clamp lifting ropes.

A still further object is to provide a clamp lifting arrangement which at all times provides sufficient tension in the clamp lifting ropes to prevent sag in the ropes and to keep the ropes on their sheaves.

The above and other objects are attained by my invention which may be here briefly summarized as consisting in certain details of construction and combinations and arrangements of parts which will be described in the specification and set forth in the appended claims.

In the accompanying sheets of drawings.

Figure 2:
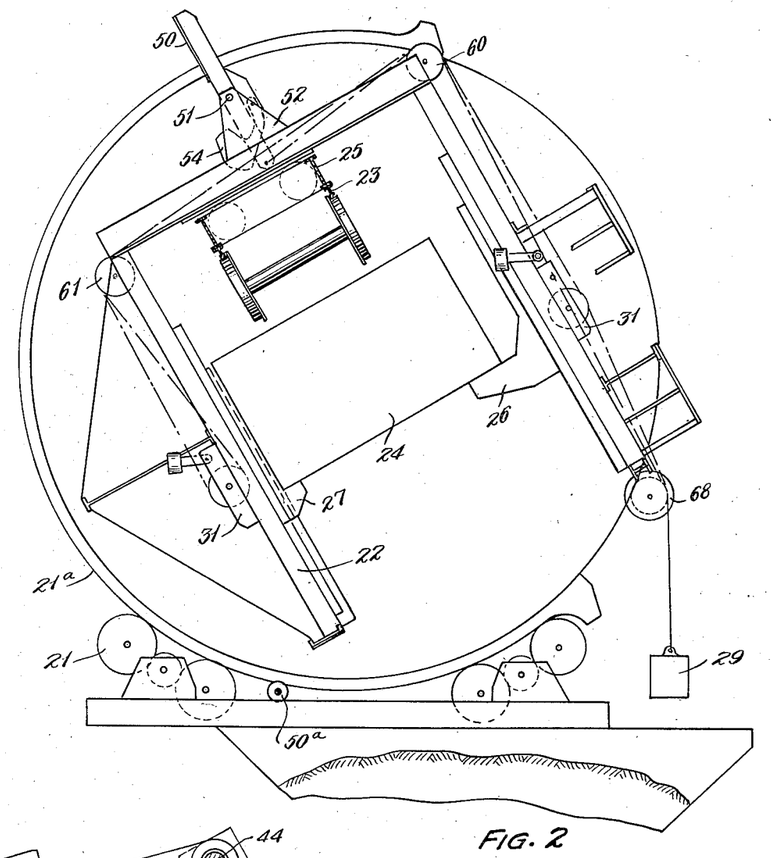
Fig. 2 is a similar view showing the car in full dumping position.
Figure 3:
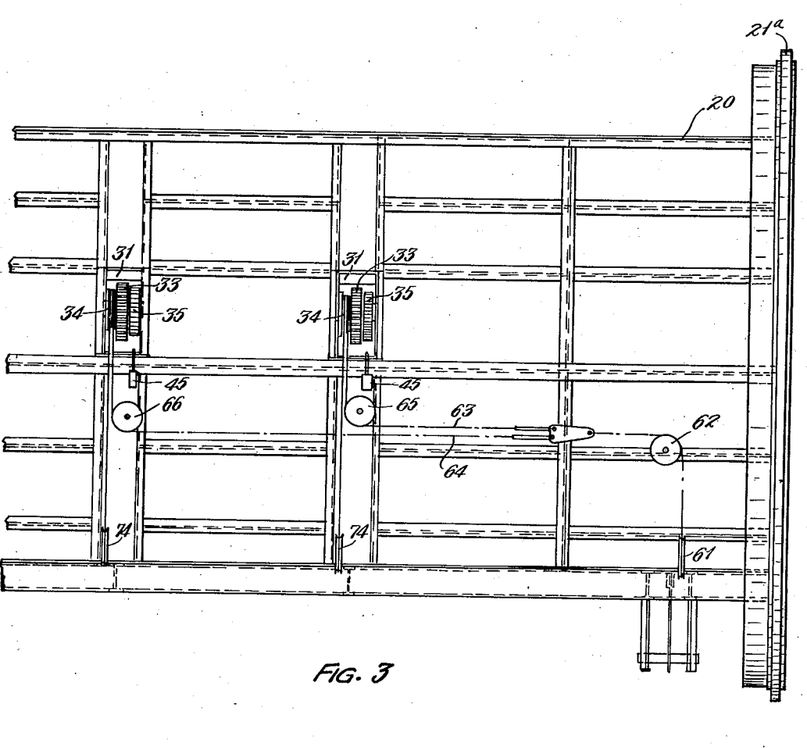
Fig. 3 is a partial side elevation looking at the dumper from the dumping side, some of the parts including the sheaves and ropes being shown diagrammatically.
Figure 4:
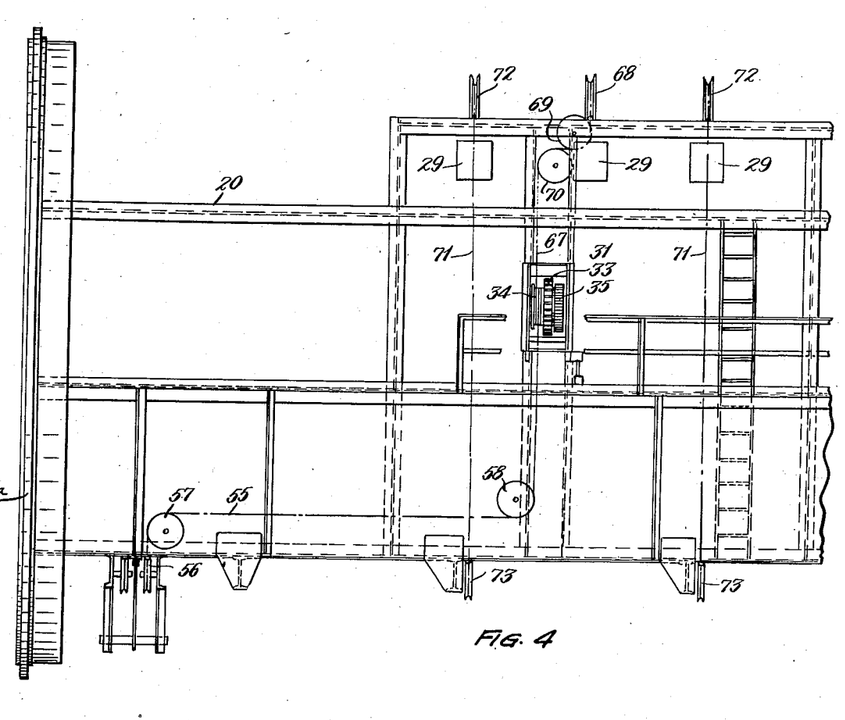
Fig. 4 is a similar partial side elevation looking at the dumper from the rear side.
Figure 5:
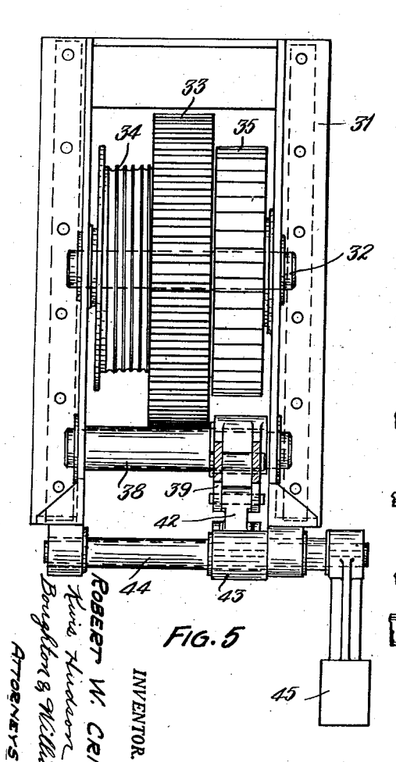
Fig. 5 is a view partly in section and partly in elevation on an enlarged scale which shows the ratchet mechanism including the counterweight for actuating the ratchet pawl, the drum on which are wound certain cables, and the gear which engages the gear teeth on the rear side of the clamp.

Referring now to the drawings, the frame of the rotary dumper is shown in Figs. 3 and 4 at 20 and is supported in the usual manner on rollers 21 engaging tracks 21a located at opposite ends of the dumper frame. 22 represents the cradle of the dumper which is provided with rails 23 on which a loaded car 24 is adapted to run. The cradle and clamps are, as usual, arranged so as to accommodate cars of different heights, as, for example, cars ranging from a minimum height of 7 feet to a maximum height of 12 feet 3 inches. The rails 23 are mounted on a laterally movable platen 25 which during the dumping operation moves toward the dumping side of the cradle until the car engages the blocking on the spill apron on that side, as shown in Fig. 2. The means for rotating the dumper and for controlling the movement of the platen are not shown as devices for accomplishing these purposes are well known in the art and any suitable means may be employed.

The present invention relates particularly to the car clamps and to the means for lowering and elevating them. It is an important feature of the present invention that the clamps are wholly independently controlled or operated, making it possible to provide a greater number of clamps on the dumping side than on the rear side. In this instance I employ six clamps, four located on the dumping side and two on the rear side where the load on the clamps is a great deal less than on the dumping side. However, different numbers of clamps may be used, as, for example, six on the dumping side and three on the rear side, but they need not of necessity be of such numbers that those on the dumping side are multiples of those on the rear side.

The clamps on the rear side of the dumper are designated 26 and those on the dumping side are designated 27. These clamps slide in vertical guides 28 of the cradle (see Fig. 6). The clamps are lowered onto the top of the car 24 by gravity assisted by counterweights 29 which are arranged on the top rear side of the cradle.

Considering next the mechanism by which the clamps are controlled, I have shown in this application two clamp controlling mechanisms. One form involves gear racks provided on the rear sides of the shanks of the clamps which racks are engaged by gears, while in the other form of the invention illustrated I have provided rack teeth on the rear sides of the shanks of the clamps which teeth are engaged by pawls. In the first instance the gear forms part of a unit with a ratchet wheel adapted to be engaged by a pawl. In both forms of the invention appropriate mechanism is provided for causing the engagement and disengagement of the pawl from the rack, it being one of the important features of the present invention that there is provided a positive releasing arrangement for the pawls from the rachets to prevent breakage of the clamp lifting ropes. I will first describe the preferred construction wherein the clamps are provided with gear racks, the same being illustrated in Figs. 1 to 11.

Figure 6:
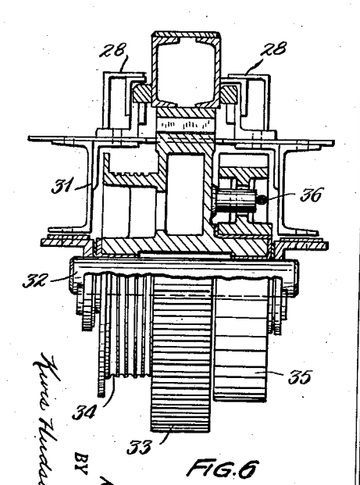
Fig. 6 is a partial plan view and a partial section of the mechanism of Fig. 5 showing, in addition, one of the car clamps in geared relation to the gear of the mechanism of Fig. 5.

The gear racks 30 are secured to the rear sides of the shanks of the clamps 26 and 27 and preferably extend substantially the full length of the shanks. Each of the clamps 26 and 27 slides up and down relative to a frame 31 which is mounted on the side of the cradle and which carries a fixed pin 32. Freely rotatable on the pin 32 is a gear 33 which at all times engages the gear rack 30 of the clamp. Fixed to one side of the gear 33 is a drum 34, see particularly Figs. 5 and 6, which is scored to accommodate ropes. Mounted on an extended hub of the gear 33, see particularly Fig. 6, is a ratchet wheel 35. This ratchet wheel is permitted a slight degree of rotation with relation to gear 33 for a purpose to be explained presently, the gear having a pair of oppositely disposed lugs 36 which lugs project through openings provided in the ratchet wheel, and these lugs are somewhat shorter than the openings but are normally held in fixed relation with respect thereto by tension springs 37.

The frame 31 which carries the gear 33, the drum 34 and the ratchet wheel 35 is also provided with a pin 38 fixed thereon on which pin is mounted a pawl support 39 adapted to oscillate on the pin 38. This pawl support carries by means of a pin 41 a pawl 40. The unit so far described functions identically for each of the different car clamps, but, for a purpose to be explained, the construction for the clamps on the rear side of the dumper differs slightly from the construction of the clamps on the dumping side.

Figures 7, 8:
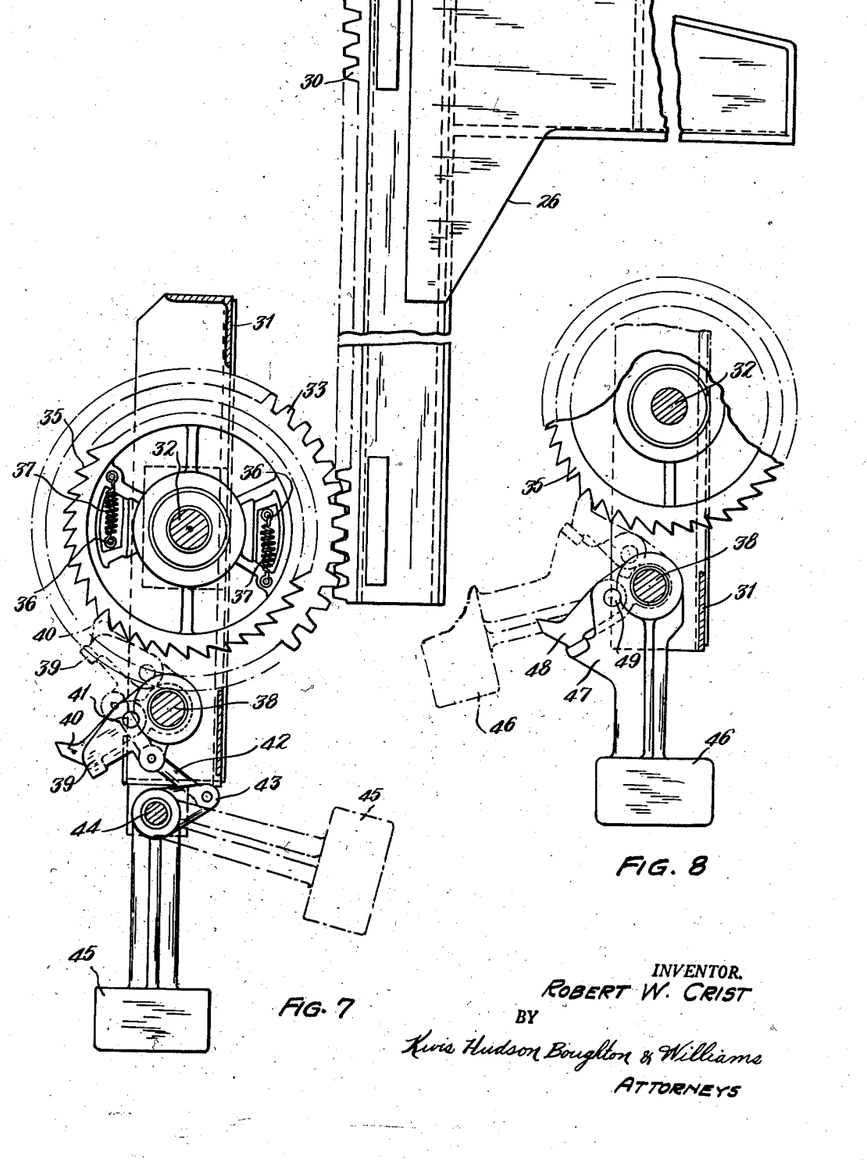
Fig. 7 is a fragmentary sectional view showing a portion of one of the rear clamps and the mechanism for actuating it including the pendulum counterweight connected by a link to the support for the pawl which is designed to drop into engagement with a ratchet to hold the clamp in dumping position, parts being broken away and omitted.
Fig. 8 is a view similar to Fig. 7 but omitting the clamp and certain other parts for the clamp on the dumping side.
Figure 9:
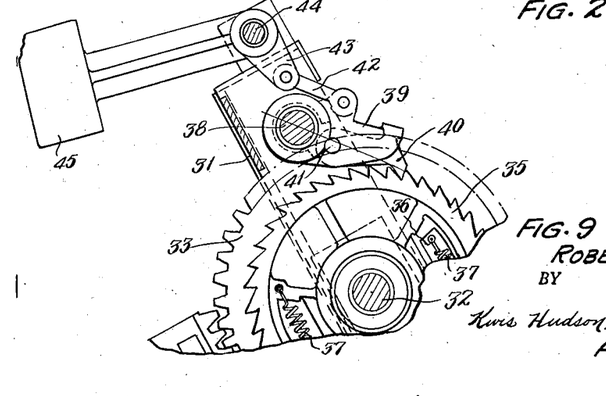
Fig. 9 is a partial side elevation of the construction shown in Fig. 7 with certain parts in section, showing the position of the pendulum counterweight when the cradle is in full dumping position.
Figure 12:
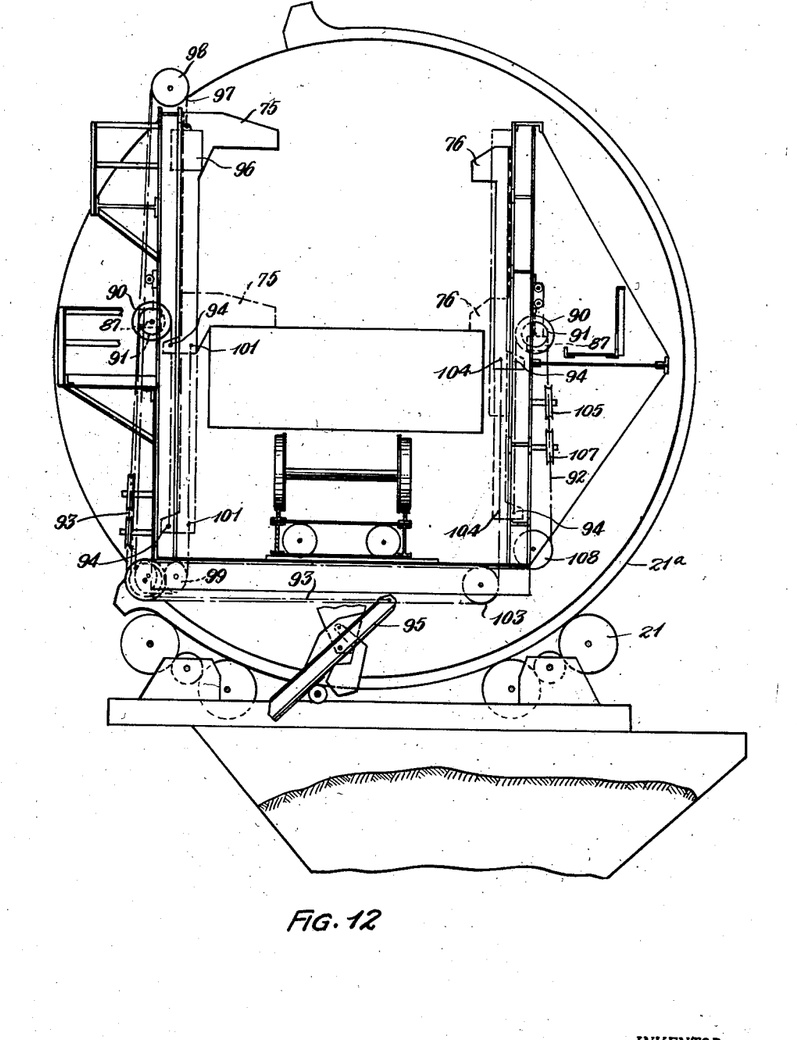
Fig. 12 is a view similar to Fig. 1 showing a modification wherein the rear sides of the clamps are provided with rack teeth instead of gear teeth.

The units on the rear side of the dumper are constructed as follows: As shown in Fig. 7, the pawl support 39 is connected by a link 42 to a crank 43 keyed to a pin 44 to which is also keyed a pendulum counterweight 45.

As shown in Fig. 8, in the units on the dumping side the pendulum counterweight 46 is mounted directly on the pin 38, and an extension 47 of this pendulum counterweight serves as a support for the pawl 48 connected to the extension 47 by a pin 49. Otherwise the construction is the same for the units on the rear and dumping sides.

The pendulum counterweights are connected differently to the pawls of the units for the clamps on the rear and on the dumping sides of the cradle for the reason that for the rear clamps the oscillations of the pawl supports and the pendulum counterweights must be in opposite directions, whereas for the clamps on the dumping side the oscillations of the pawl supports and the pendulum counterweights must be in the same direction.

Figures 1, 10, 11:
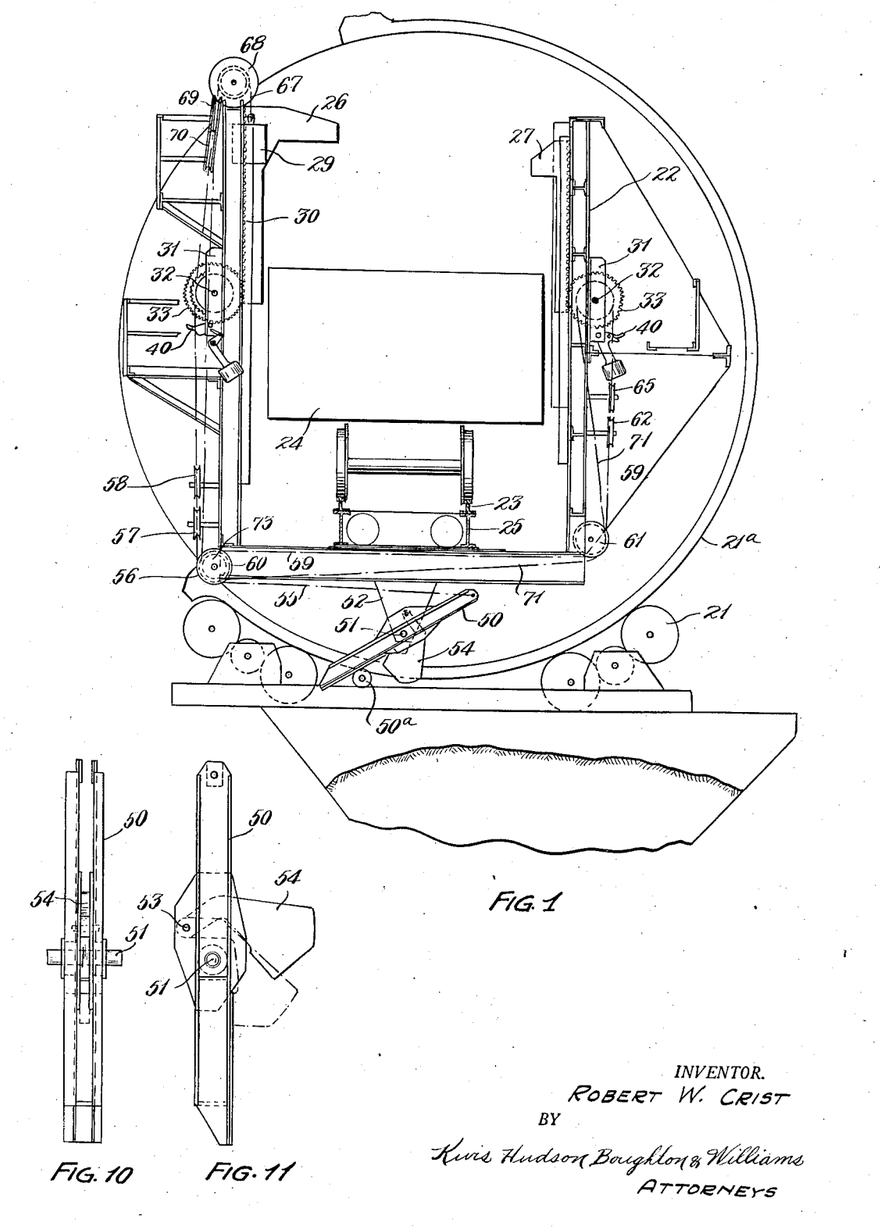
Fig. 1 is a partial end elevation of a dumper with a car in upright position thereon just prior to the dumping operation.
Fig. 10 is a front view of one of the clamp lifting arms which is attached to the bottom of the dumper.
Fig. 11 is a side view of the same.

At each end of the dumper two clamp lifting arms 50 are pivoted on a pin 51 which in turn is secured to a bracket 52 on the underside of the cradle frame. This is shown in Fig. 1, and it will be understood that the construction will be identical at the opposite ends of the dumper. Each clamp lifting arm 50, when the cradle is being restored to its normal upright position, engages a roller 50a attached to the sill on the foundation of the dumper. Pivoted by means of a pin 53 to each clamp lifting arm 50 is a pendulum counterweight 54. The clamp lifting arm is so made that the pendulum counterweight swings through the upper half and not through the lower half.

One clamp lifting arm 50 at each end of the cradle has attached to its upper end a rope 55 which passes around a sheave 56, then around a sheave 57 (see Fig. 4), and then around a sheave 58, and after passing partway around the drum 34, is anchored to the outer side of the drum (the drum being the drum of one of the two drum, gear and ratchet units associated with one of the two clamps 26 on the rear side of the dumper). Attached also to the upper end of each clamp lifting arm 50 is a rope 59 which passes around a sheave 60 coaxial with the sheave 56 and then back around a sheave 61 and then up around a sheave 62, and it then divides into two ropes 63 and 64 (see Fig. 3). The rope 63 then passes around a sheave 65 while the rope 64 passes around a sheave 66, and both of these ropes then extend upwardly and after passing partway around the drums 34 are attached to the outer sides thereof, these drums 34 forming parts of the two drum, gear and ratchet units in turn associated with two of the clamps on the dumping side of the cradle.

As previously stated, each clamp is provided with a counterweight 29. Each of the counterweights for the two clamps on the rear side of the cradle is connected to a rope 67 which passes around a sheave 68, then downwardly around sheaves 69 and 70 and then downwardly to the outer side of the drum 34 (see Fig. 4) to oppose the clamp lifting ropes 55. Each of the ropes 71 (see Fig. 4) connected to the four counterweights 29 associated with the four clamps on the dumping side passes around a sheave 72 at the top rear side of the dumper and then passes downwardly around a sheave 73 at the lower rear side of the dumper (see Fig. 1), and then forwardly around a sheave 74 which is coaxial with the sheave 61 (see Fig. 3), and then upwardly around the inner side of the drum 34 of each of the drum, gear and ratchet units for the four clamps on the dumping side to oppose the clamp lifting ropes 63 and 64. It will be understood that this rope 71 will be attached to the drum 34 after passing several times around the same.

With a loaded car in upright position on the cradle and the clamps 26 and 27 elevated to clear the top of the car, rotation of the cradle is started in the dumping direction (clockwise as viewed in Fig. 1), and the platen immediately moves to the dumping side of the cradle until the car engages the blocking on the spill apron on that side. At the same time the clamp lifting arms 50 begin rotation in a counterclockwise direction, paying out the clamp lifting ropes 55 and 59. As the ropes 55 and 59 are paid out, the clamps 26 and 27 descend in their guides to the top of the car partly through gravity and partly through the constant pull of the counterweights 29 attached to the drums 34. The descent of the clamps will be as fast as permitted by the paying out of the clamp lifting ropes 55 and 59 and will continue until the clamps engage the top of the car. At a point just before the cradle has rotated 90°, the pendulum counterweights 45 and 46 have forced the pawls 40 and 48 into engagement with the ratchet wheels 35, thus locking the clamps against the top of the car. Before this point is reached, the clamp lifting arms 50 have become disengaged from the rollers 50a which, as before stated, are attached to the sill on the foundation of the dumper, but the pendulum counterweights 54 are positioned on the arms in such a way as to always tend to produce a clockwise rotation of the arms 50, thus providing sufficient tension in the clamp lifting ropes to prevent undue sagging and to keep the ropes on their sheaves.

With the car securely held in the cradle by the action of the pawls 40 and 48 on the ratchets 35 and therefore by the locking of the clamps, rotation is continued until the cradle has been rotated about 150° from its normal position, and when this point is reached all of the material of the car has been discharged therefrom.

Since the holding action of the clamps against outward movement of the car is produced by a locking action of the pawls 40 and 48 on the ratchets 35 rather than by pressure from the counterweights, no excess pressure can be applied to crush the top of the car other than by the weight of the car, by the material which may by chance remain in the car, and by the constant but small pressure from the counterweights 29.

When the material has been discharged from the car, the cradle is rotated in the opposite direction. When it is rotated past the point where the car is in horizontal position and further on to a point where it is inclined about 60° from the vertical, the pendulum counterweights 45 and 46 have forced disengagement of the pawls 40 and 48 from the ratchets 35, leaving the clamps free to be lifted from the top of the car by the clamp lifting arms 50.

This clamp lifting operation begins somewhat after the ratchets are freed and when the clamp lifting arms 50 engage the rollers attached to the sill. It continues until the cradle is in the upright position, when the clamps will be fully raised. The platen has been moved sidewise to move the car out of contact with the spill apron and into alignment with the runoff tracks.

It sometimes happens (with prior car clamps) when dumping cars that a clamp will not descend entirely onto the car top but onto a lump of material lodged on the car top. While the cradle revolves, this lump may be crushed or may become dislodged, in which case, if rotation has progressed beyond 90°, the car will either sag toward the freed clamp or an additional load comes onto the remaining clamps on that side of the dumper. In the present instance, the counterweight 29 associated with the clamp in question acts to immediately bring the freed clamp into contact with the car top where it is instantly and positively reclamped by the pawl in the ratchet wheel. It will be noted, however, that, with my improved method of clamping, the clamp failing to engage the car top for the reason above mentioned is the only car clamp freed when the lump is dislodged since all of the clamps act independently. If the clamps were arranged in pairs and each pair held against the car top by a common rope, as in the method employed heretofore, it is obvious that two clamps would be freed, one on each side of the car.

An important advantage of my improved car clamping arrangement lies in the fact that when the ratchet pawl 40 or 48 is engaged with the ratchet wheel 35, the pawl pin 41 or 49 is practically on a line passing from the center line of the pin 38 to the point of engagement of the pawl with the ratchet wheel 35 (see Fig. 9) so that only a slight effort of the pendulum counterweight 45 or 46 will knuckle the pawl out of engagement with the ratchet wheel and insure quick and easy release of the clamp preparatory to being raised by the clamp lifting arms. It is obvious that should the ratchet pawls fail to disengage, the clamp lifting ropes would be broken when the clamp lifting arms 50 engage the roller 50a attached to the sill, but for the reason stated, liability of this is entirely avoided by the present construction.

As was previously stated, the gear 33 of each unit has two lugs 36 projecting through two openings in the ratchet wheel 35, but under the action of the tension springs 37 these lugs are held in a predetermined position. This construction permits a slight degree of rotation of the ratchet wheel with respect to the gear 33 and the drum 34 under the control of the tension springs 37. This feature is provided for the reason that when a loaded car enters the cradle the springs of the car trucks are compressed possibly as much as 7/8" or 1", and it is obvious that, if the hooks have made snug engagement with the car top, when the empty car is returning to upright position the car truck springs would exert a pressure on the clamps, which pressure would in turn create a pressure of the pawls 40 and 48 on the ratchet wheels 35 to hinder their release. It is almost certain that this pawl pressure would be overcome by the knuckling action of the pendulum counterweights 45 and 46 as described above, but, as an additional feature of safety, this freedom of movement of the ratchet wheel 35 with respect to the gear 33 and the drum 34 is provided.

Referring now to the modification which I have illustrated in Figs. 12 to 18 inclusive, it will be seen that instead of attaching to the shanks of the clamps 75 and 76 gear racks as in the construction first described, I attach to the rear sides of the shanks pawl racks 77 which extend from the upper ends of the clamps downwardly for a suitable distance along the shanks. The pawl mechanisms for the clamps on the rear and dumping sides of the cradle, although composed of similar parts, are somewhat differently arranged.

Figures 13, 14:
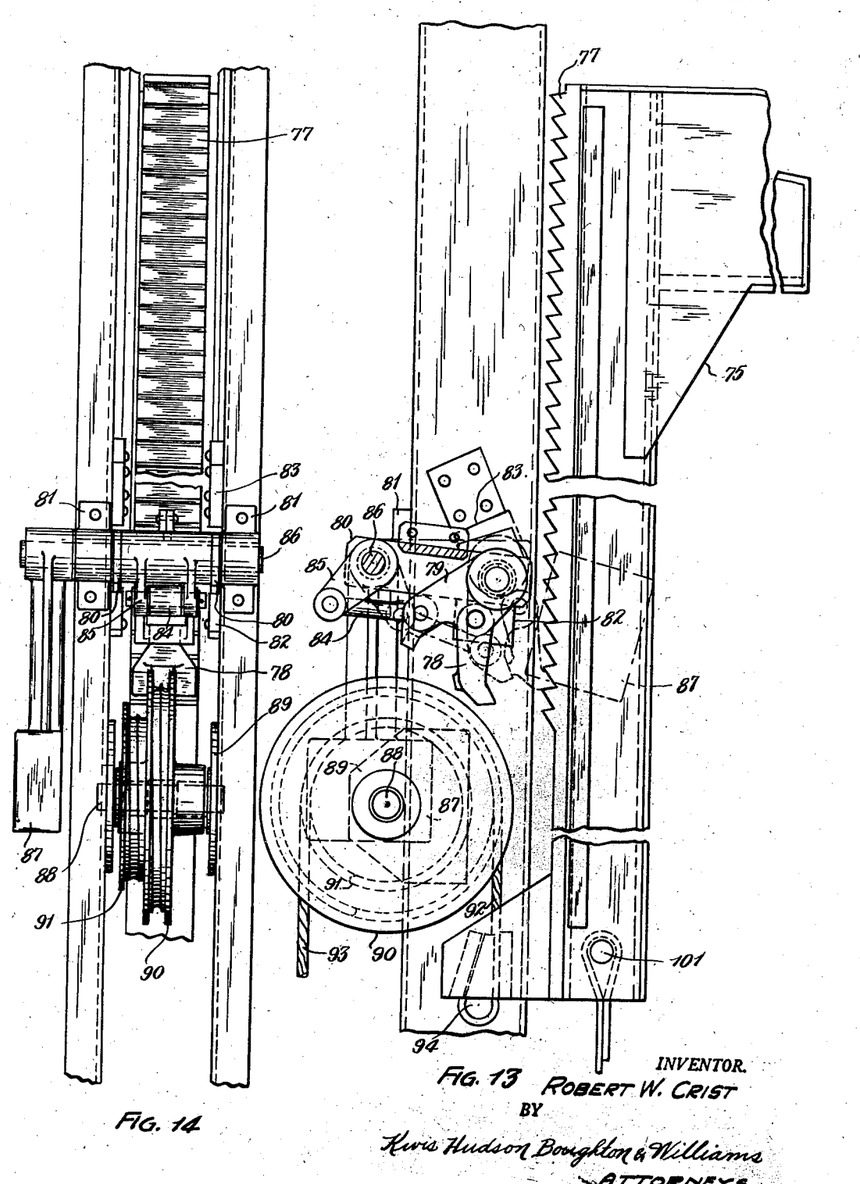
Fig. 13 is a side view corresponding to Fig. 7 showing the modification.
Fig. 14 is a front view of the construction shown in Fig. 13.
Figure 15:
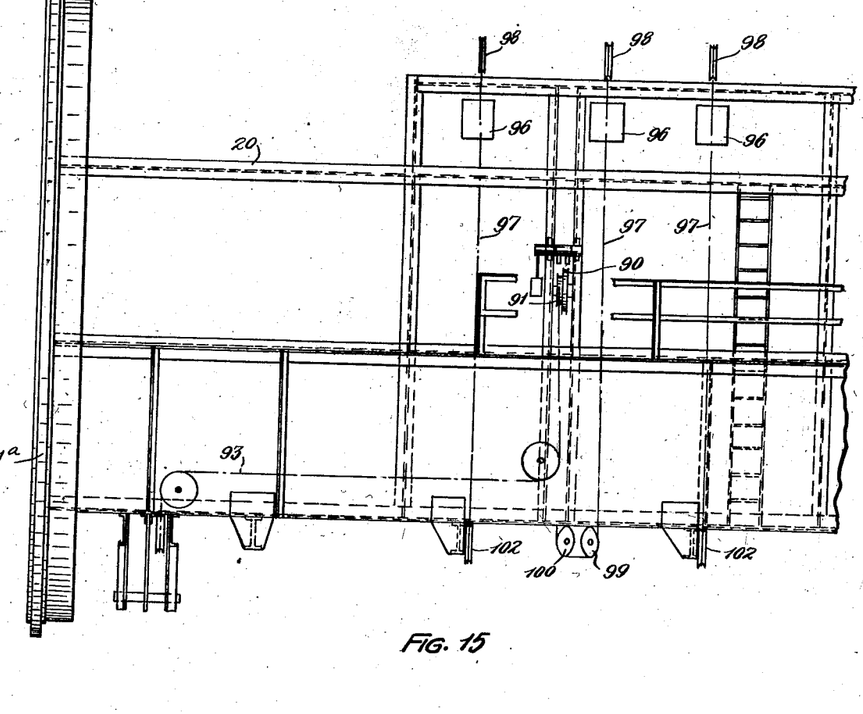
Fig. 15 is a view corresponding to Fig. 4 but showing the modified construction.
Figure 16:
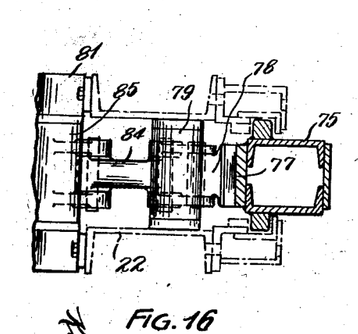
Fig. 16 is a transverse sectional view through the clamp and its associated parts showing the modification.
Figure 17:
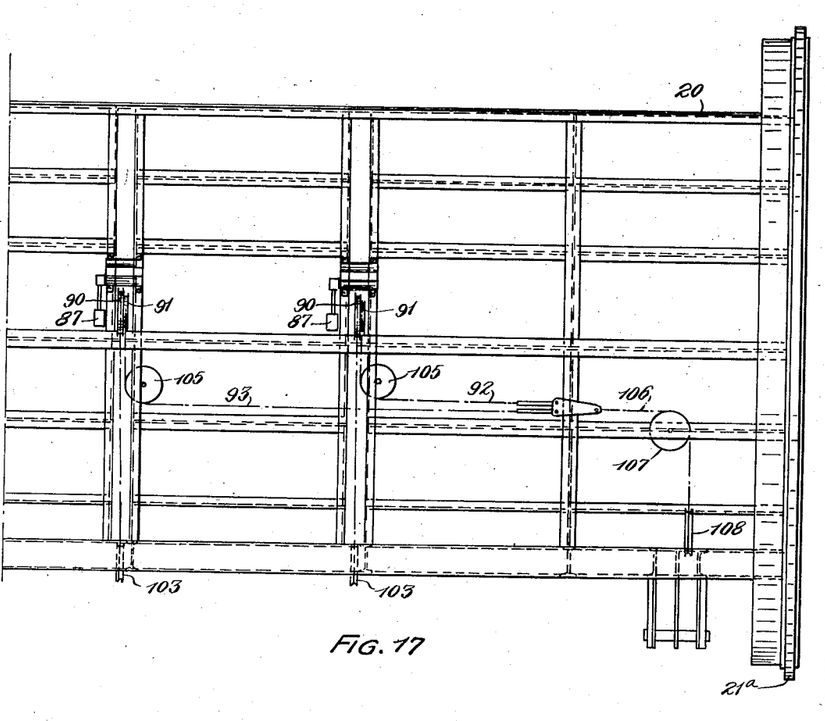
Fig. 17 is a view corresponding substantially to Fig. 3 but showing the modification.

I will first describe the pawl mechanism for the clamps on the rear side of the cradle, reference being had to Figs. 13 and 14. The racks 77 are adapted to be engaged by pawls 78 which are pinned to pawl supports 79 which in turn are pinned to the inner end of an arm 80. Arm 80 is pinned at its outer end to a pair of brackets 81 which are secured to the side of the cradle frame. The arm 80 is permitted a slight movement between a bottom stop 82 and a top stop 83 which are also secured to the cradle frame in order to provide what may be termed backlash to compensate for the deflection of the car springs when the material is dumped from the car, as described for the first construction in connection with the parts 36 and 37 shown in Fig. 7. In this instance, however, no springs are necessary as the arm 80 will drop by gravity. The pawl support 79 is connected by means of a link 84 to a crank 85 which is keyed to a pin 86 which in turn is supported by the brackets 81 previously referred to. Also keyed to the pin 86 is a pendulum counterweight 87. Just below the mechanism for locking the pawl to the rack there is mounted on a pin 88 a differential drum secured in brackets 89 in turn secured to the cradle frame. This differential drum, which is scored for receiving ropes, is composed of a larger section 90 and a smaller section 91. The larger section 90 of the differential drum has secured to it a clamp lifting rope 92 to be referred to presently. To the smaller section 91 of the drum and to the opposite side thereof a clamp lifting rope 93 is attached which rope leads over suitable deflecting sheaves to the clamp lifting arm, as in the construction first described. The differential drum is used to provide for considerable travel of the clamps which is necessary when the dumper is designed to dump cars of widely varying heights. When designed for use with cars varying only slightly in height, the differential drum can be replaced by a single scored drum or sheave and the clamp lifting ropes can then be made in a single piece. It will be understood that the ropes 92 and 93 pass a suitable distance around the drum sections 90 and 91 before being secured thereto.

Figure 18:
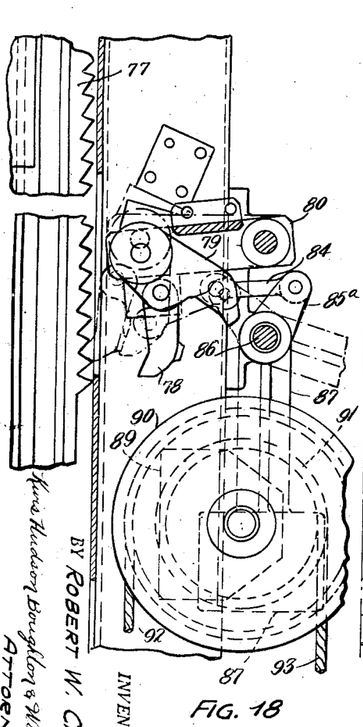
Fig. 18 is a view corresponding substantially to Fig. 8 but showing the modified construction.

The construction of the pawl mechanism for the clamps 76 on the dumping side of the dumper is shown in Fig. 18. By referring to this figure it will be noted that the pawl 78 is pinned, as in the mechanism described in connection with clamp 75, to a pawl support 79 which in turn is pinned to the inner end of an arm 80. The pawl support 79 is connected by a link 84 corresponding to the link 84 of the construction described in connection with clamp 75 to a crank 85a which extends upwardly instead of downwardly, this crank being keyed to a pin 86 similar to that first described. Also keyed to the end of pin 86 is a pendulum counterweight 87. Mounted as before in a pair of brackets 89 is a differential drum composed of two parts 90 and 91 on which are wound and secured two clamp lifting ropes 92 and 93.

The clamp lifting ropes 92 of the pawl controlling mechanisms for the clamps on both the rear and dumping sides are attached at 94 to the lower ends of the car clamps. Each of the ropes 93 passes around the drum section 91 of smaller diameter, then passes around suitable deflecting sheaves and is attached to the clamp lifting arms 95 which function precisely as in the construction first described. The reeving of these ropes will be explained presently.

Each of the car clamps 75 and 76 is provided with a counterweight 96. The principal difference between the construction now being described and the construction first described lies in the fact that the ropes 97 for the counterweights 96 pass around sheaves at the bottom of the cradle and then upwardly and are attached to the lower ends of the clamps instead of being attached to the opposite side of the clamp lifting drum as in the construction first described. It will be noted that the rope 97 for each of the counterweights 96 passes around a sheave 98 arranged at the top of the cradle frame. The ropes 97 for the two (or more) rear clamps of the dumper extend downwardly and around a pair of sheaves 99 and 100 (see Fig. 15) and lead upwardly and are attached to the lower ends of the shanks of the clamps 75 at 101. The ropes 97 for the clamps 76, after passing around sheaves 98, extend downwardly around sheaves 102 (see Fig. 15), then across the bottom of the dumper and around sheaves 103 and then upwardly and are attached to the lower ends of the shanks of the car clamps 76 at 104.

The ropes 93 which pass around the smaller sections 91 of the drums for the two clamps on the rear side of the dumper extend downwardly and around suitable deflecting sheaves and are attached to the upper ends of the clamp lifting arms 95.

The ropes 93 which pass around the smaller sections of the drums for the clamps on the dumping side pass around sheaves 105 (see Fig. 17) where they are joined, and, after being joined together, are connected to a rope 106 which, after passing around upper sheaves 107 and lower sheaves 108, extend across the bottom of the dumper around a sheave at the lefthand side (as viewed in Fig. 12) and then back to the upper ends of the clamp lifting arms 95.

In operation, this modified construction is very similar to the construction first described. When the cradle containing a loaded car is rotated in dumping direction, the clamp lifting arms 95 permit the descent of the clamps until they engage the top of the car. When rotation has progressed about 75°, the pendulum counterweights 87 have forced the pawls 78 into engagement with the pawl racks 77 on the shanks of the clamps. After the cradle has been rotated to the full dumping position of the car and the material has been discharged, the rotation is reversed. When the car is at an angle of approximately 70° from the vertical on the return cycle, the pendulum counterweights 87 force the disengagement of the pawls 78 from the racks 77 so that the clamps may be raised when the clamp lifting arms come into action as in the construction first described.

It will be apparent from Fig. 13 that the pendulum counterweights 87 have the same toggle or knuckling action in releasing the pawls from the racks as in the construction first described because the pin connecting the pawl to the pawl support is practically on a line between the pin at the inner end of arm 80 and the center of the tooth of the pawl, and only a slight effort of the pendulum counterweight 87 will knuckle the pawl out of engagement with the rack and insure quick and easy release of the clamp preparatory to being raised by the clamp lifting arms.

Likewise it will be seen that the arm 80 is free to move toward the stop 83 to provide the backlash to compensate for the extension of the car springs after the load has been dumped from the car. Additionally, it will be seen that the pendulum counterweight connected to the clamp lifting arms 95 insures sufficient tension at all times in the clamp lifting ropes to prevent sag in the ropes and to keep the ropes on their sheaves, precisely as in the construction first described.

Thus it will be seen that, with either construction shown and described, the various objects stated in the early part of the specification are very effectively attained. I do not desire to be confined to the precise details shown but aim in my claims to cover all modifications which do not involve a departure from the spirit and the scope of the invention.

Having thus described my invention, I claim:

1. In a rotary car dumper, a cradle adapted to receive a car and having a plurality of clamps engageable with the top of the car on both sides thereof to hold the car on the cradle while the car is being dumped, and means for locking each clamp in car holding position including a gear rack extending longitudinally of the shank of the clamp, a gear at all times engaging the rack, a pawl and ratchet mechanism associated with the gear, and means including a pendulum counterweight for setting the pawl in the ratchet during the movement of the cradle and car toward dumping position.

2. In a rotary car dumper, a cradle adapted to receive a car and having a plurality of clamps engageable with the top of the car on both sides thereof to hold the car on the cradle while the car is being dumped, and means for locking each clamp in car holding position including a gear rack extending longitudinally of the shank of the clamp, a gear at all times engaging the rack, a pawl and ratchet mechanism associated with the gear, and means including a pendulum counterweight for setting the pawl in the ratchet during the movement of the cradle and car toward dumping position, there being a lost motion connection or backlash between the gear and the ratchet.

3. In a rotary car dumper, a cradle adapted to receive a car and having a plurality of clamps engageable with the top of the car on both sides thereof to hold the car on the cradle while the car is being dumped, counterweights connected to the clamps for lowering the clamps onto the top of the car, a gear rack on each clamp, and a unit associated with each clamp for holding the clamps against the top of the car during the dumping operation, said unit including a drum or sheave, a gear engaging the gear rack and rotatable with the drum or sheave, a pawl and ratchet mechanism, the ratchet being also rotatable with the drum or sheave, and a pendulum counterweight supported adjacent the pawl in operative relation thereto for setting the pawl into engagement with the ratchet.

4. In a rotary car dumper, a cradle adapted to receive a car and having a plurality of clamps engageable with the top of the car on both sides thereof to hold the car on the cradle while the car is being dumped, counterweights connected to the clamps for lowering the clamps onto the top of the car, a gear rack on each clamp, and a unit associated with each clamp for holding the clamps against the top of the car during the dumping operation, said unit including a drum or sheave, a gear rotatable with the drum or sheave and engaging the gear rack, a pawl and ratchet mechanism, the ratchet also being rotatable with the drum or sheave, and a pendulum counterweight supported adjacent to the pawl in operative relation thereto for setting the pawl into engagement with the ratchet, each of the first-named counterweights having a rope wound on the drum or sheave, and clamp lifting arms adapted to engage means at the bottom of the dumper, said clamp lifting arms having ropes also extending about the drums or sheaves.

5. In a rotary car dumper, a cradle adapted to receive a car and having a plurality of clamps engageable with the top of the car at both sides thereof to hold the car on the cradle while the car is being dumped, pivoted clamp lifting arms arranged at the bottom of the cradle and provided with ropes operatively connected to the clamps through the medium of sheaves about which the clamp lifting ropes pass to lift the clamps when the cradle is being restored to normal position, said clamp lifting arms being provided with pendulum counterweights pivotally mounted with respect to said arms and serving to prevent sag in the lifting ropes and to keep said ropes on their sheaves when the car is in dumping position or is approaching dumping position.

6. In a rotary car dumper, a cradle adapted to receive a car and having a plurality of clamps engageable with the top of the car on both sides thereof to hold the car on the cradle while the car is being dumped, clamp lifting arms pivotally connected at the bottom of the cradle, means on the foundation of the dumper for shifting said arms to lift the clamps, a unit associated with each clamp including a drum or sheave, ropes connected to the arms and to said drums or sheaves, the arms having pendulum counterweights pivotally mounted with respect to said arms and serving to provide sufficient tension in the clamp lifting ropes to prevent undue sag and to keep the ropes on their sheaves.

7. In a rotary car dumper, a cradle adapted to receive a car and having a plurality of clamps engageable with the top of the car on both sides thereof to hold the car on the cradle while the car is being dumped, a cradle frame in which the clamps have sliding movement means for raising and lowering the clamps with respect to the car, means for locking each clamp in car holding position including a pawl and ratchet mechanism associated with the clamp, and a pendulum counterweight operatively associated with the pawl, means operatively connecting the counterweight with the pawl and serving to set said pawl in engagment with the ratchet as the cradle is moved toward dumping position, said means comprising a pawl support, a pin connecting the pawl to the pawl support, and a pin supported by the frame on which the pawl support is mounted, the point of engagement of the pawl with the ratchet and the centers of the two pins being substantially on a line whereby a slight effort of the pendulum counterweight will knuckle the pawl out of engagement with the ratchet and insure easy release of the clamp.

8. In a rotary car dumper, a cradle adapted to receive a car and having a plurality of clamps engageable with the top of the car on both sides thereof to hold the car on the cradle while the car is being dumped, each clamp being independently operated with respect to the other clamps, a pawl and ratchet unit for holding each clamp against the top of the car during the dumping operation, clamp lifting arms pivotally connected to the bottom of the cradle, means on the foundation of the dumper for shifting said arms to lift the clamps, a drum forming a part of the unit of each clamp, ropes connected to the arms and to said drums, the arms having a pendulum counterweight pivotally mounted with respect to the arms and serving to provide sufficient tension in the clamp lifting ropes and to keep the ropes on their sheaves, there being a lost motion connection or backlash for the pawl of each unit.

9. In a rotary dumper, a cradle adapted to receive a car and having a plurality of clamps engageable with the top of the car on both sides thereof to hold the car on the cradle while the car is being dumper, each clamp being independently operated with respect to the other clamps, a unit associated with each clamp for holding the clamp against the car during the dumping operation, said unit including a drum and a pawl and ratchet mechanism, the pawl being supported in operative relation to the ratchet, a pendulum counterweight operatively connected with the pawl for setting the pawl into engagement with the ratchet, counterweights connected to the clamps for lowering the clamps onto the top of the car, pivoted clamp lifting arms arranged at the bottom of the cradle, said clamp lifting arms having ropes, sheaves mounted at both sides of the cradle, part of said ropes extending from said arms and passing about the sheaves on one side of the cradle and then around part of the drums, other of said ropes passing around sheaves at the opposite side of the cradle and then around the drums associated with the clamps on the last-mentioned side, said arms having pendulum counterweights pivotally mounted with respect to said arms and serving to prevent sag in the lifting ropes, there being a lost motion connection or backlash for the pawl of each unit.

ROBERT W. CRIST.